United States Patent [19]

Speranza et al.

[11] Patent Number: 5,138,095

[45] Date of Patent: Aug. 11, 1992

[54] BISULFITE ADDITION PRODUCTS OF KETONE-TERMINATED POLYOXYALKYLENE COMPOUNDS

[75] Inventors: George P. Speranza, Austin; John R. Sanderson, Leander, both of Tex.

[73] Assignee: Texaco Chemical Company, White Plains, N.Y.

[21] Appl. No.: 594,465

[22] Filed: Oct. 9, 1990

[51] Int. Cl.$^5$ .............................................. C11D 1/12
[52] U.S. Cl. ................................... 562/103; 562/107; 562/110; 562/111; 252/554; 252/555
[58] Field of Search ............... 562/103, 110, 111, 107; 252/554, 555

[56] References Cited

U.S. PATENT DOCUMENTS

| | | | |
|---|---|---|---|
| 2,880,236 | 3/1959 | Mehltretter et al. | 562/103 |
| 3,937,725 | 2/1976 | Pfeifer | 562/103 |
| 4,442,043 | 4/1984 | McCoy et al. | 260/513 R |
| 4,524,022 | 6/1985 | Naylor | 252/548 |
| 4,524,023 | 6/1985 | McCoy et al. | 252/548 |
| 4,612,142 | 9/1986 | Piörr et al. | 562/111 |
| 4,960,948 | 10/1990 | Sanderson et al. | 568/405 |

OTHER PUBLICATIONS

I. L. Finar, *Organic Chemistry*, Longmans, London, 1967, p. 176.

P. R. Young et al., "General Acid Catalyzed Breakdown of Ketone Bisulfites," *Journal of the American Chemical Society*, vol. 100, No. 4, 1978, pp. 1228-1235.

*Primary Examiner*—Jose G. Dees
*Assistant Examiner*—B. Frazier
*Attorney, Agent, or Firm*—Jack H. Park; Kenneth R. Priem; David L. Mossman

[57] ABSTRACT

Bisulfite addition products, which exhibit surface active properties, prepared by reacting a ketone-terminated polyoxyalkylene compound, such as a diketone of a polyoxypropylene glycol, a monoketone of a polyoxyalkylene alcohol, etc. with an ammonium or alkali metal bisulfite are disclosed.

31 Claims, No Drawings

5,138,095

BISULFITE ADDITION PRODUCTS OF KETONE-TERMINATED POLYOXYALKYLENE COMPOUNDS

CROSS REFERENCE TO RELATED APPLICATIONS

This application is related to U.S. Pat. application for Ketone-Terminated Polyoxyalkylene Compounds of John R. Sanderson, Edward T. Marquis and John M. Larkin, U.S. Ser. No. 07/594,464, filed Oct. 9, 1990, now Pat. No. 5,072,050.

BACKGROUND OF THE INVENTION

1. Field of the Invention

This invention relates to bisulfite addition products of ketone-terminated polyoxyalkylene compounds and to a method for their preparation. More particularly, this invention relates to bisulfite addition products of ketone-terminated polyoxyalkylene compounds prepared by reacting a ketone-terminated polyoxyalkylene compound with an ammonium or alkali metal bisulfite. The bisulfite derivatives thus formed exhibit good surface active properties and are useful as detergents.

2. Prior Art

General information on the formation of bisulfite addition products by reaction with, for example, sodium bisulfite with aldehydes, methyl ketones, cyclic ketones, etc. is given in "Advanced Organic Chemistry" by J. March, John Wiley and Sons, New York, N.Y., 1985, pp. 795-6, and in "Organic Chemistry" by I. L. Finar, Longmans, London, 1967, p. 176.

P. R. Young and W. P. Jencks, in J.A.G.S. 100:4, 1228-35 (1978) disclose the preparation of a number of bisulfite addition products of substituted acetophenones such as compounds of the formula:

$$X\text{-}C_6H_4\text{-}C(OH)(CH_3)(SO_3^-)$$

where X is p-OCH$_3$, -H, p-Cl and p-N$_{02}$

U.S. Pat. No. 4,524,022 discloses hydrotropes useful for increasing the effectiveness of surfactants prepared by reacting a bisulfite, such as sodium bisulfite, with dicyclopentadiene to form the bisulfite addition product.

U.S. Pat. No. 4,524,023 discloses bicyclodecyl ether sulfonates prepared by reacting, for example, ammonium bisulfite, with ethoxylated dicyclopentenyl-beta-hydroxyethyl ether. These compounds are useful in liquid detergent formulations.

U.S. Pat. No. 4,442,043 relates to surface active agents prepared, for example, by reacting a mercaptoethanol adduct of dicyclopentadiene, allyl chloride, and sodium bisulfite.

Surprisingly, it has been found that bisulfite addition products which exhibit surface active properties can be prepared by reacting a bisulfite, such as sodium bisulfite, with a ketone-terminated polyoxyalkylene alcohol or polyol.

SUMMARY OF THE INVENTION

This invention relates to bisulfite addition products of ketone-terminated polyoxyalkylene compounds. The compounds of this invention have the formula:

$$R\text{-}[(OCH_2CH)_a\text{-}(OCH_2CH)_b\text{-}OCH_2\text{-}\underset{\underset{OH}{|}}{\overset{\overset{SO_3M}{|}}{C}}\text{-}CH_3]_m,$$
$$\phantom{R\text{-}[(}R'\phantom{CH)_a\text{-}(}R''$$

wherein:
R is linear or branched alkyl from about 1 to about 18 carbon atoms and, preferably, 1 to about 12 carbon atoms as exemplified by methyl, ethyl, isopropyl, t-butyl, hexyl, octyl or lauryl, etc., or represents the nucleus of an oxyalkylation susceptible trihydric compound having 3 to about 20 carbon atoms, and, preferably, 3 to about 10 carbon atoms, as exemplified by glycerine, trimethylolpropane, a trialkanolamine, such as triethanolamine, etc., or is the radical $$-CH_2\text{-}\underset{\underset{OH}{|}}{\overset{\overset{SO_3M}{|}}{C}}\text{-}CH_3,$$

M is a cation selected from the group consisting of sodium, potassium and ammonium,
a ranges from 0 to about 20,
b ranges from 1 to about 50,
R' and R'' are independently selected from the group consisting of hydrogen and the methyl or ethyl radical, and
m is 1 or 3 with the proviso that when R is alkyl or the said radical m is 1 and when R is the said nucleus m is 3.

Preferably, the sum of a +b ranges from about 15 to about 40 and R'' is the methyl radical. This invention also relates to aqueous solutions of the above-described ketone-terminated polyoxyalkylene compounds.

In another aspect this invention relates to a process for producing bisulfite addition products of ketone-terminated polyoxyalkylene compounds having at least one terminal group of the formula:

$$-CH_2\text{-}\underset{\underset{OH}{|}}{\overset{\overset{SO_3M}{|}}{C}}\text{-}CH_3,$$

wherein M is a cation selected from the group consisting of sodium, potassium and ammonium, which comprises reacting a bisulfite of the formula:

MHSO$_3$, wherein M has the same meaning as above in the presence of water with a compound of the formula:

$$A\text{-}[(OCH_2CH)_a\text{-}(OCH_2CH)_b\text{-}OCH_2\text{-}\underset{\underset{O}{\|}}{C}\text{-}CH_3]_m,$$
$$\phantom{A\text{-}[(}R'\phantom{CH)_a\text{-}(}R''$$

wherein:
A is linear or branched alkyl of from about 1 to about 18 carbon atoms and, preferably, 1 to about 12 carbon atoms as exemplified by methyl, ethyl, isopropyl, t-butyl, hexyl, octyl, lauryl, etc., or represents the nucleus of an oxyalkylation susceptible trihydric compound having 3 to about 20 carbon atoms and, preferably, 3 to about 10 carbon atoms as exemplified by trimethylolpropane, a trialkanolamine, such as triethanolamine, etc., or is the radical

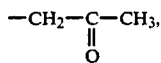

a ranges from 0 to about 20,
b ranges from 1 to about 50,
R' and R" are independently selected from the group consisting of hydrogen and the methyl or ethyl radical, and m is 1 or 3 and with the proviso that when R is alkyl m is 1 and when R is the said nucleus m is 3.

The products of this invention may also be referred to as hydroxy sulfonates.

The products of this invention which exhibit good surface activity properties are useful as surfactants and detergents, pigment-wetting agents, mineral flotation and flocculation aids, metal working fluids, in enhanced oil or gas recovery from porous underground formations, etc.

DESCRIPTION OF THE PREFERRED EMBODIMENTS

The reaction employed to make the novel bisulfite addition products of this invention may be performed simply and conveniently.

Bisulfites useful in the process of this invention include, for example, sodium, potassium or ammonium bisulfite.

The ketone-terminated polyoxyalkylene alcohols and polyols utilized in preparing the bisulfite addition products of this invention are prepared, for example, by oxidizing the terminal hydroxyl groups of these compounds to ketone groups. In one method the hydroxyl-terminated starting material is brought into contact with a hypochlorite oxidant, such as sodium hypochlorite, and in the presence of acetic acid and water at a temperature of about 10° to about 50° C., a pressure of about 0 to 1000 psig and for a total reaction time of about 0.5 to about 20 hours whereby the terminal hydroxyl groups are selectively converted to ketone groups. This method of preparing ketone-terminated polyoxyalkylene compounds is more completely described in co-pending Sanderson et al., U.S. application Ser. No. 07/456,891, filed Dec. 26, 1989, now U.S. Pat. No. 4,960,948, and entitled "Manufacture of Ketone Derivatives of Polyoxypropylene Glycols" which is incorporated herein in its entirety by reference.

Ketone-terminated polyoxyalkylene compounds especially useful in preparing the bisulfite addition products of this invention include diketone compounds of the formula:

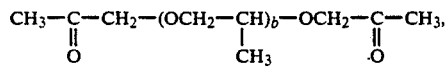

wherein b ranges from 1 to about 50. Ketone-terminated compounds of this type can be prepared in the manner previously described by utilizing, for example, a polyoxypropylene glycol having an average molecular weight of about 230, a polyoxypropylene glycol having an average molecular weight of about 400 or a polyoxypropylene glycol having an average molecular weight of about 2000. All of these glycol products are manufactured and sold by Texaco Chemical Company, Houston, TX.

Polyoxyalkylene alcohols and polyols useful in preparing the ketone-terminated polyoxyalkylene starting materials employed in this invention can be conveniently prepared by methods well known in the art by reacting the alcohol or polyol initiator with ethylene oxide and/or propylene oxide in the presence of a suitable catalyst such as potassium hydroxide.

In preparing the bisulfite addition products of this invention generally, the reaction generally will be conducted at ambient temperature although temperatures ranging from 10° to 150° C., and preferably from about 20° to about 80° C. may be employed.

The amount of the ammonium, sodium or potassium bisulfite reacted with a diketone starting material can be varied over a wide range of from about 2 to about 5 moles or more per mole of the diketone utilized. When the bisulfite is reacted with a monoketone starting material usually from about 1 to about 5 moles or more per mole of the monoketone is employed. It is usually preferred to use a slight excess of the bisulfite, for example, about 1.1 mole of bisulfite per mole of ketone.

Usually, the reaction is carried out at atmospheric pressure although pressures ranging from atmospheric to about 2000 psig can be utilized. Reaction times will vary according to the mole ratio of the reactants, the reaction temperature, the particular bisulfite and ketone employed and other reaction conditions. Generally, the reaction time will range from about 5 to about 120 hours or more and, preferably, will be from about 10 to about 75 hours. If a large excess of bisulfite is employed in the reaction, it can be conveniently removed from the product by filtration.

The bisulfite addition products of this invention are also useful for preparing aqueous surfactant compositions in concentrations ranging from about 0.01 weight percent and higher depending on the method of application. Usually, the aqueous solutions will contain from about 0.1 weight percent to about 20 weight percent of the bisulfite addition product and, preferably will contain from about 0.1 weight percent to about 5 weight percent with the residuum being detergent adjuvants as described below. When the products of this invention are employed in aqueous surfactant compositions they ordinarily are present in at least the minimal concentrations disclosed accompanied by one or more of the following classes of materials which are generically referred to as detergent adjuvants.

1. Inorganic salts, acids and bases

These are usually referred to as "builders." These salts usually comprise silicates, such as sodium and potassium silicates; alkalis, such as sodium and potassium carbonates, bicarbonates, etc.; water soluble salts of phosphates, pyrophosphates, orthophosphates and polyphosphates such as sodium and potassium tripolyphosphates and hexametaphosphates; organic polyphosphates such as the sodium and potassium salts of ethylene diphosphonic acid, the sodium and potassium salts of ethane-1, 1,2-triphosphonic acid, etc. Usually these materials constitute from about 40 to 80 weight percent of the compositions in which they are employed.

2. Organic builders or additives

These are substances which contribute to characteristics such as detergency, foaming power, emulsifying power or soil suspending effect. Typical organic builders include sodium carboxymethyl cellulose, sequestering agents such as ethylenediamine-tetraacetic acid and the fatty monoethanolamides, etc.

3. Special purpose additives

These include solubilizing additives such as lower alcohols, glycols, glycol ethers, bleaches or brighteners of various structures which share in common that they are dyestuffs and they do not absorb or reflect light in the visible range of the specrum.

The aqueous solutions of this invention comprise:

A. 0.1 weight percent to 20 weight percent of a compound of the formula:

$$R-[(OCH_2CH)_a-(OCH_2CH)_b-OCH_2-\underset{\underset{OH}{|}}{\overset{\overset{SO_3M}{|}}{C}}-CH_3]_m,$$
$$\phantom{R-[(OCH_2CH)_a}\overset{|}{R'}\phantom{-(OCH_2CH)_b}\overset{|}{R''}$$

wherein

R is linear or branched alkyl of from 1 to about 18 carbon atoms or represents the nucleus of an oxyalkylation susceptible trihydric compound having 3 to about 20 carbon atoms or the radical $$-CH_2-\underset{\underset{OH}{|}}{\overset{\overset{SO_3M}{|}}{C}}-CH_3,$$

M is a cation selected from the group consisting of sodium, potassium and ammonium, a ranges from 0 to about 20, b ranges from 1 to about 50, and R' and R" are independently selected from the group consisting of hydrogen and the methyl or ethyl radical, m is 1 or 3 and with the proviso that when R is alkyl, m is 1 and when R is the said nucleus m is 3 and B. water.

These aqueous solutions are prepared by mixing the desired amount of water with one or more of the bisulfite addition compounds of this invention.

Examples 1-3, which follow, describe the preparation of the ketone-terminated polyoxyalkylene compounds employed in preparing the bisulfite addition products.

Examples 4-6, which also follow, illustrate the preparation of the bisulfite addition products of this invention but are not intended to be limiting thereof.

EXAMPLE 1

Preparation Of The Diketone Of Polypropylene Glycol-1000 (6538-93)

Polypropylene glycol-1000 (PPG-1000, a product having an average molecular weight of about 1000 made by the Texaco Chemical Company, Houston, Tex.) (1000 g, Hydroxyl No. 106-107), acetic acid (200g) and demineralized water (400g) were charged to a three-neck flask equipped with stirrer, water bath, thermometer, condenser and large addition funnel. Sodium hypochlorite (2000g, 10%) was added to the stirred solution over 2-2.5 hours. The temperature was maintained at 25° C. by the addition of ice to the water bath. The reaction mixture was stirred for an additional 15 hours at 25° C. Cyclohexane (1000 ml) was poured into the flask resulting in the formation of two layers with the upper layer being the organic phase and the lower layer being the aqueous phase. The organic and the aqueous layers were separated and the aqueous layer extracted 2×200 ml cyclohexane. The combined organic layers were then extracted (1×200 ml H20) (2×200 ml 5% NaHCO$_3$), and dried over anhydrous Na$_2$SO$_4$. The cyclohexane was removed on a rotary evaporator to give 961g of the diketone product, a pale yellow to clear oil.

Analysis of the product gave the following results:

| | |
|---|---|
| Hydroxyl No. | 22.5 mg KOH/g |
| Acid No. | 2.47 mg KOH/g |
| Saponification Value | 8.02 mg KOH/g |

IR analysis indicated the presence of ketone carbonyl.

EXAMPLE 2

Preparation Of The Diketone Of Polypropylene Glycol-2000 (6528-94)

The procedure and work-up followed in this example were the same as in Preparation 6528-93 except that poly- propylene-2000 (PPG-2000, Hydroxyl No. 56-57, a product having an average molecular weight of about 2000 made by the Texaco Chemical Company, Houston, Tex.) was charged to the reaction flask. After solvent removal 946g of the diketone product, a light yellow oil, was obtained.

Analysis of the product gave the following results:

| | |
|---|---|
| Hydroxyl No. | 8.19 mg KOH/g |
| Acid No. | 1.60 mg KOH/g |
| Saponification Value | 15.4 mg KOH/g |

IR analysis indicated the presence of ketone carbonyl.

EXAMPLE 3

Preparation Of The Monoketone Of An Ethoxylated-propoxylated C$_{10-12}$ Mixed Alcohol (6528-95)

The procedure followed in this example was the same as in Preparation 6528-93 except that 825g of special alcohol adduct was added. This monofunctional product which was prepared from a C$_{10-12}$ mixed alcohol ethoxylated to an average degree of 2 ethylene oxide groups followed by propoxylation to an average of 6 propylene oxide groups had a molecular weight of about 600. After solvent removal, 806 g of the monoketone product was obtained.

Analysis of the product gave the following results:

| | |
|---|---|
| Hydroxyl No. | 22.7 mg KOH/g |
| Acid No. | 2.02 mg KOH/g |
| Saponification Value | ~0 |

IR analysis indicated the presence of ketone carbonyl.

EXAMPLE 4

Bisulfite Addition Product Of Polypropylene Glycol-2000 Diketone (6528-96-1)

Sodium bisulfite (5.2g) was added to 50g of the diketone of polypropylene glycol-2000 prepared in Example 2 along with 10 ml water. A small exotherm resulted and the mixture slowly became more viscous. The mixture was stirred overnight. A small amount of the bisulfite addition product, a viscous paste, foamed when shaken with water.

The sodium bisulfite addition product was shown to be present by IR analysis. The surface tension value of a sample of this product is shown in Table I which follows.

EXAMPLE 5

Sodium Bisulfite Addition Product Of Polypropylene Glycol-1000 Diketone (6528-96-2)

Sodium bisulfite (10.4 g) was added to 50 g of the diketone of polypropylene glycol-1000 prepared in Example 1 along with 10 ml water. There was a small exotherm and the mixture slowly became more viscous. The mixture was stirred overnight at ambient temperature. A small amount of the bisulfite addition product, a viscous paste, foamed when shaken with water.

The sodium bisulfite addition product was identified by IR analysis. The surface tension value of a sample of this product in water is reported in Table I which follows.

EXAMPLE 6

Ammonium Bisulfite Addition Product Of Polypropylene Glycol-2000 Diketone (6528-98-1)

To polypropylene glycol-2000 diketone prepared in Example 2 (6528-94) was added 10.4 g of a 47% $NH_4HSO_3$ solution. The mixture was stirred for 3 days at ambient temperature. The resulting ammonium bisulfite addition product was a paste-like material which was identified by IR analysis.

The surface tension value of a sample of this product was measured and is reported in Table I which follows.

EXAMPLE 7

Ammonium Bisulfite Addition Product Of Polypropylene Glycol-1000 Diketone (6528-98-2)

To 50 g of the polypropylene glycol-1000 diketone prepared in Example 1 (6528-93) was added 20.8g of a 47% solution of $NH_4HSO_3$. The mixture was stirred for 3 days at ambient temperature. The resulting ammonium bisulfite addition product which was a very viscous oil was identified by IR analysis.

The surface tension value of this product in aqueous solution is reported in Table I which follows.

EXAMPLE 8

Ammonium Bisulfite Addition Product Of The Monoketone Of Ethoxylated-propoxylated $C_{10-12}$ Mixed Alcohol (6528-99-1)

To 50 g of the monoketone prepared in Example 3 (6528-95) of the $C_{10-12}.4EO.6PO$ special adduct was added 10.4g of $NaHSO_3$ and 10 ml water. The mixture was stirred overnight at ambient temperature. The resulting sodium bisulfite addition product of the monoketone was a very viscous oil which was identified by IR analysis. The surface tension value of this product was determined and is reported in Table I.

TABLE I

SURFACE TENSION VALUES OF BISULFITE ADDITION PRODUCTS

| Example | Product | Surface Tension @ 25° C., 0.1 wt %, deionized water (dyne/cm) |
| --- | --- | --- |
| 4 | Sodium bisulfite addition product of the diketone of PPG-2000 (6528-96-1) | 31.4 |
| 5 | Sodium bisulfite addition product of the diketone PPG-1000 (6528-96-2) | 30.6 |
| 6 | Ammonium bisulfite addition product of the diketone of PPG-2000 (6528-98-1) | 29.6 |
| 7 | Ammonium bisulfite addition product of the diketone of PPG-1000 (6528-98-2) | 29.1 |
| 8 | Ammonium bisulfite addition product of the monoketone of $C_{10-12}.4EO.6PO$ alcohol | 28.8 |
| SURFONIC® | N-95 (Comparison) Average 9.5 molar ethoxylate of nonylphenol | 30.8 |
| SURFONIC® | N-40 (Comparison) Average 4 molar ethoxylate of nonylphenol | 27.5 |

The data shown above indicates that the products of this invention, i.e., the products of Examples 4–8 incl., exhibit good surface active values which compare favorably with the results obtained with SURFONIC® N-95 and N-40. The surface tension values obtained with the products of this invention provide clear indication that these products can be employed in surfactant applications. These same products were found to be useful in cleansing laboratory glassware.

What is claimed is:

1. A compound of the formula:

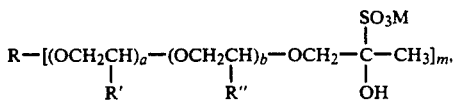

wherein:

R is linear or branched alkyl of from about 1 to about 18 carbon atoms or represents the nucleus of an oxyalkylation susceptible trihydric compound having 3 to about 20 carbon atoms, or the radical

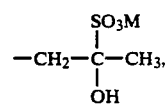

M is a cation selected from the group consisting of sodium, potassium and ammonium, a ranges from 0 to about 20, b ranges from 1 to about 50, R' and R" are independently selected from the group consisting of hydrogen and the methyl or ethyl radical, and m is 1 or 3 and with the proviso that when R is alkyl or the said radical m is 1 and when R is the said nucleus m is 3.

2. The compound of claim 1 wherein R is alkyl of from about 1 to about 18 carbon atoms.

3. The compound of claim 1 wherein R represents the nucleus of an oxyalkylation susceptible trihydric compound having 3 to about 20 carbon atoms.

4. The compound of claim 1 wherein R represents the nucleus of an oxyalkylation susceptible trihydric compound selected from the group consisting of glycerine, trimethylolpropane and triethanolamine.

5. The compound of claim 1 wherein R is the radical

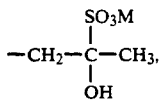

wherein M is a cation selected from the group consisting of sodium, potassium and ammonium.

6. The compound of claim 1 wherein a is 0.

7. The compound of claim 1 wherein M is sodium.

8. The compound of claim 1 wherein M is ammonium.

9. The compound of claim 1 wherein a is 0 and R" is methyl.

10. The compound of claim 1 wherein R' is hydrogen and R" is methyl.

11. The compound of claim 1 wherein R represents the nucleus of an oxyalkylation susceptible trihydric compound selected from the group consisting of glycerine, trimethylolpropane and triethanolamine, a is 0, R" is methyl and M is ammonium.

12. The compound of claim 1 wherein R is the radical

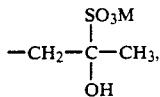

a is 0, R" is methyl and M is sodium.

13. The compound of claim 1 wherein R is the radical

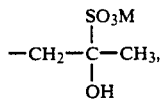

a is 0, R' is the methyl radical and M is ammonium.

14. The compound of claim 1 wherein R is alkyl of from about 1 to about 18 carbon atoms, R' is hydrogen, R" is the methyl radical and M is sodium.

15. The compound of claim 1 wherein R is alkyl of from about 1 to about 18 carbon atoms, R' is hydrogen, R" is the methyl radical, and M is ammonium.

16. The compound of claim 1 wherein R represents the nucleus of an oxyalkylation susceptible trihydric alcohol or a trihydric amine having 3 to about 20 carbon atoms.

17. The compound of claim 4 wherein the oxyalkylation susceptible trihydric compound is glycerine.

18. The compound of claim 4 wherein the oxyalkylation susceptible trihydric compound is trimethylolpropane.

19. The compound of claim 4 wherein the oxyalkylation susceptible trihydric compound is triethanolamine.

20. An aqueous solution comprising:
A. 0.1 wt. % to about 20 wt. % of a compound of the formula:

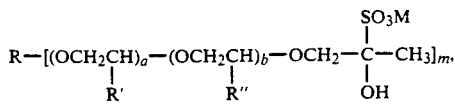

wherein:
R is alkyl of from about 1 to about 18 carbon atoms or represents the nucleus of an oxyalkylation susceptible trihydric compound having 3 to about 20 carbon atoms, or the radical

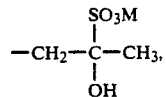

M is a cation selected from the group consisting of sodium, potassium and ammonium,
a ranges from 0 to about 20,
b ranges from 1 to about 50,
R' and R" are independently selected from the group consisting of hydrogen and the methyl or ethyl radical,
m is 1 or 3 and with the proviso that when A is alkyl or the said radical m is 1 and when A represents the said nucleus m is 3, and
B. water.

21. The solution of claim 20 wherein the said compound comprises 0.1 wt. % to about 5 wt. %.

22. The solution of claim 20 wherein R in the said compound is alkyl of from about 1 to about 18 carbon atoms.

23. The solution of claim 20 wherein R in the said compound represents the nucleus of an oxyalkylation susceptible trihydric compound selected from the group consisting of glycerine, trimethylolpropane and triethanolamine.

24. The solution of claim 20 wherein R in the said compound is the radical:

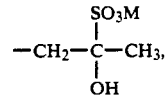

wherein M is a cation selected from the group consisting of sodium, potassium and ammonium.

25. The solution of claim 20 wherein in the said compound a is 0.

26. The solution of claim 20 wherein in the said compound M is sodium.

27. The solution of claim 20 wherein in the said compound M is ammonium.

28. The solution of claim 20 wherein R in said compound represents the nucleus of an oxyalkylation susceptible trihydric alcohol or trihydric amine having 3 to about 20 carbon atoms.

29. The solution of claim 23 wherein the oxyalkylation susceptible trihydric compound is glycerine.

30. The solution of claim 23 wherein the oxyalkylation susceptible trihydric compound is trimethylolpropane.

31. The solution of claim 23 wherein the oxyalkylation susceptible trihydric compound is triethanolamine.

* * * * *